R. Z. HOPKINS.
VEHICLE SHIPPING APPARATUS.
APPLICATION FILED JUNE 23, 1919.
1,339,890.
Patented May 11, 1920.
4 SHEETS—SHEET 1.
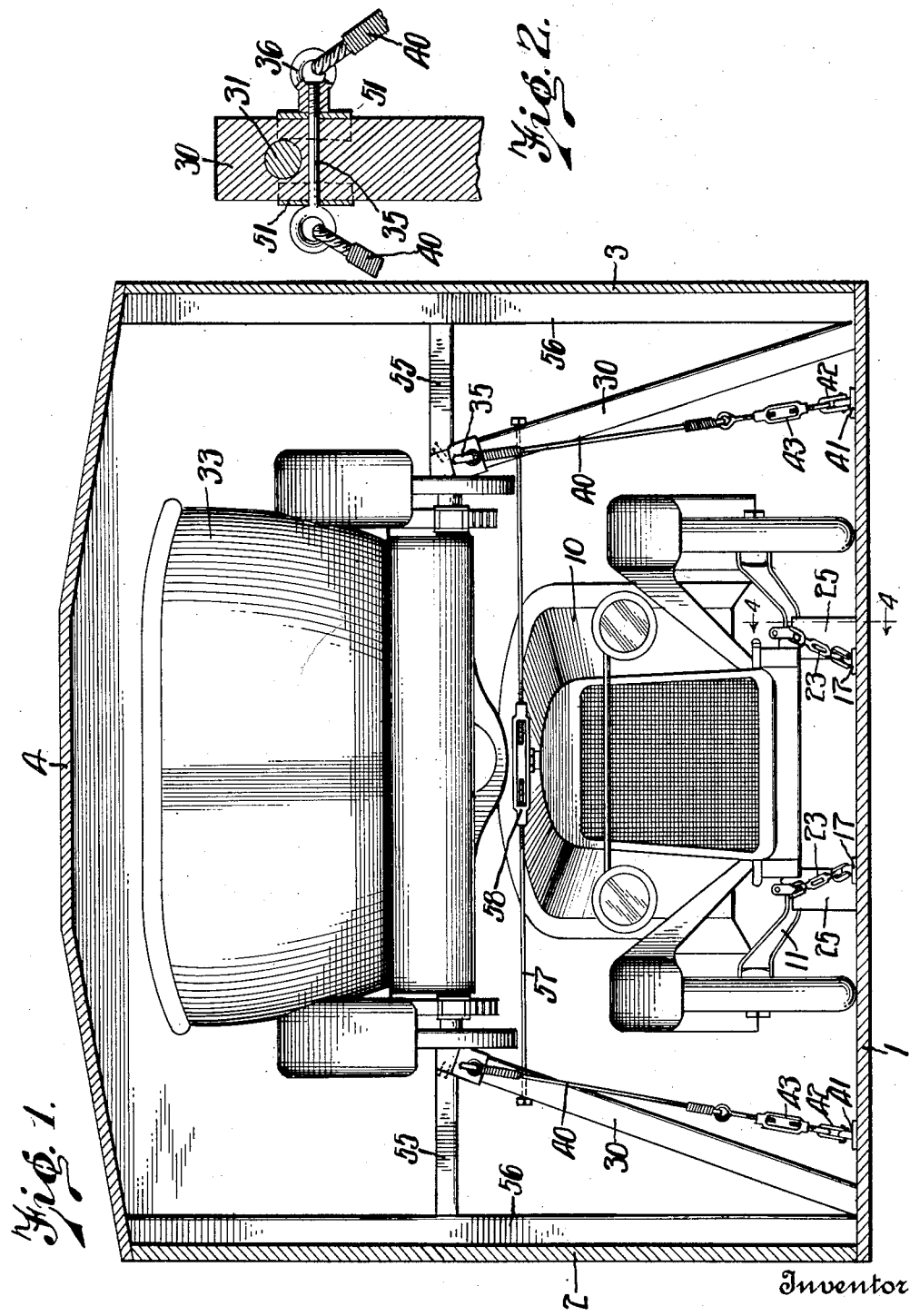
Inventor
Ralph Z. Hopkins,
By
Attorneys

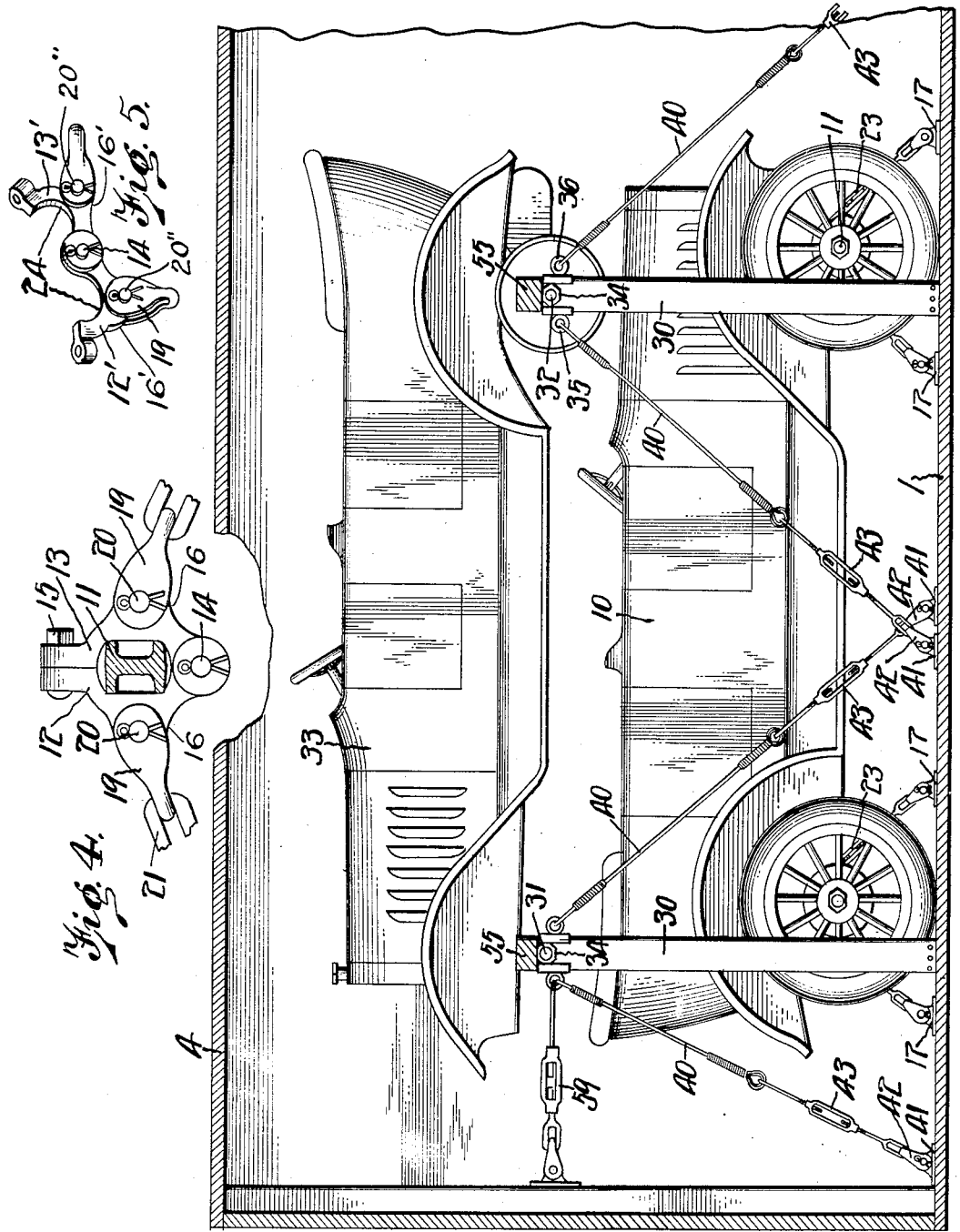

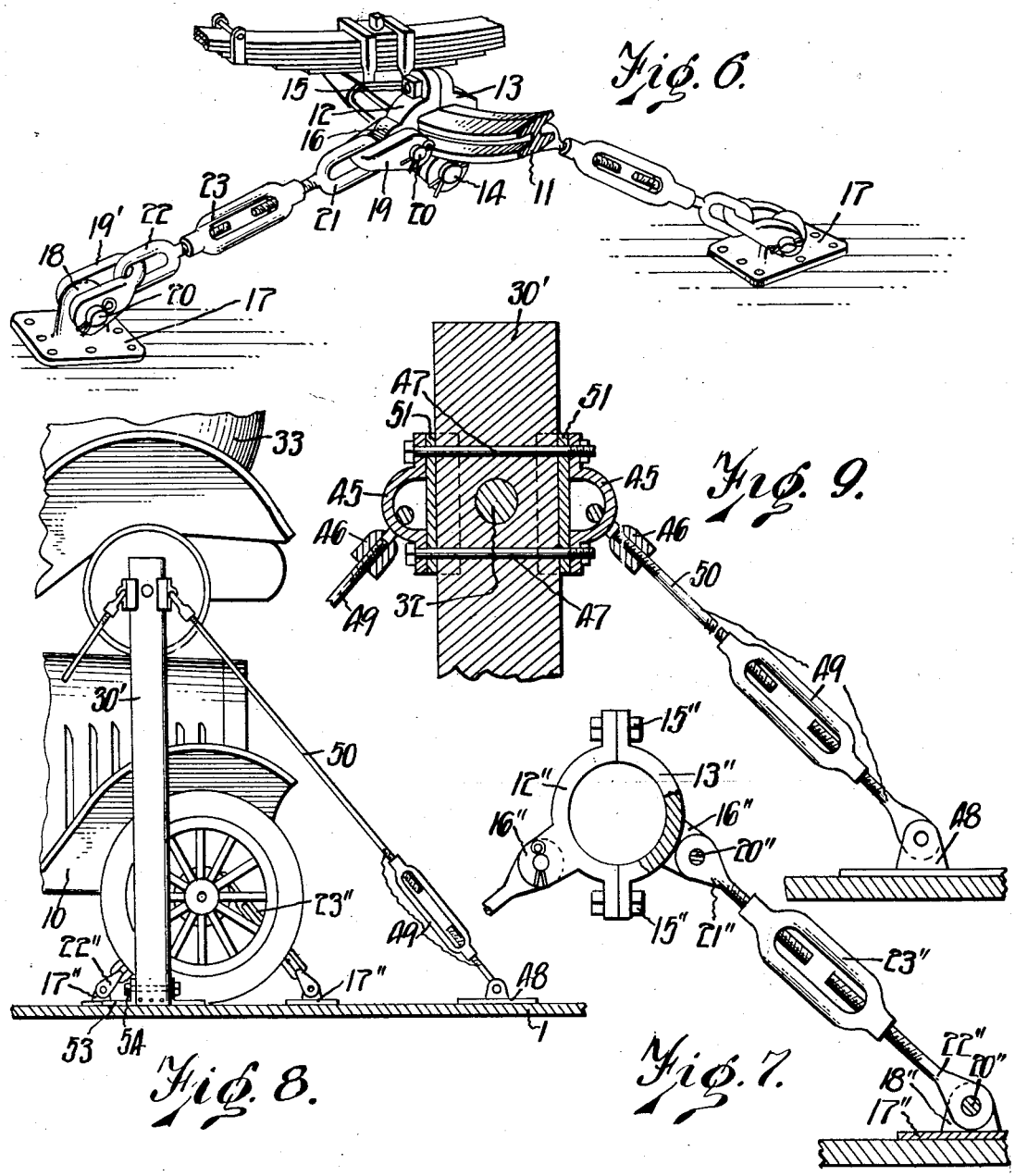

R. Z. HOPKINS.
VEHICLE SHIPPING APPARATUS.
APPLICATION FILED JUNE 23, 1919.
1,339,890.
Patented May 11, 1920.
4 SHEETS—SHEET 4.
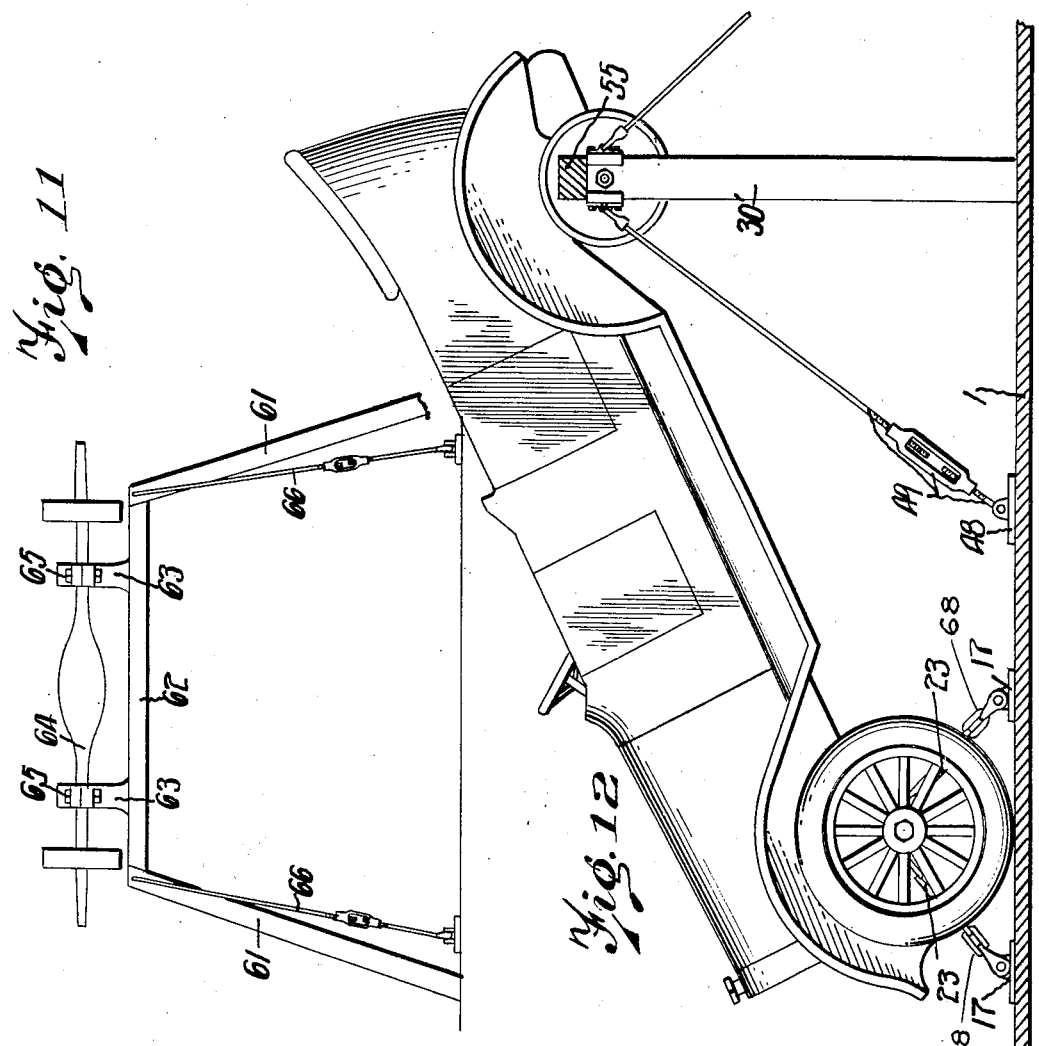
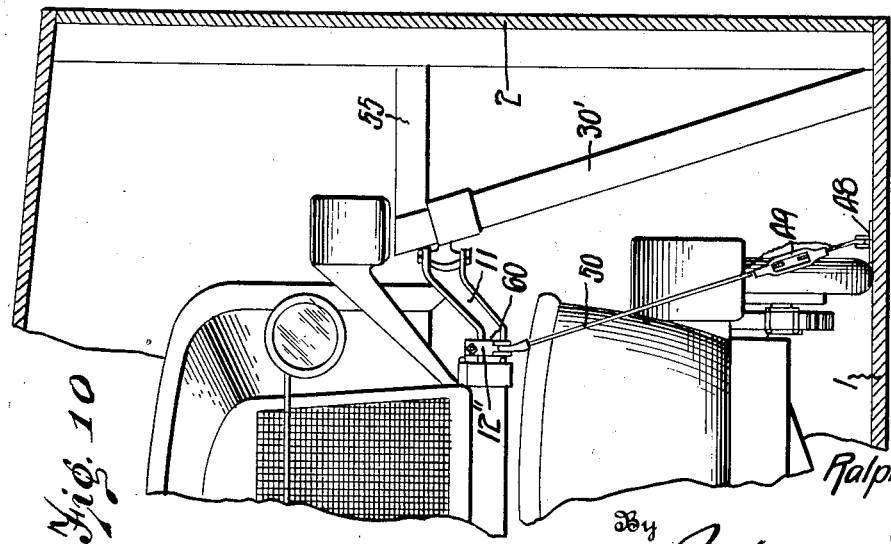
Inventor
Ralph Z. Hopkins,
By
Attorneys

UNITED STATES PATENT OFFICE.

RALPH Z. HOPKINS, OF DETROIT, MICHIGAN.

VEHICLE-SHIPPING APPARATUS.

1,339,890. Specification of Letters Patent. Patented May 11, 1920.

Application filed June 23, 1919. Serial No. 305,953.

*To all whom it may concern:*

Be it known that I, RALPH Z. HOPKINS, a citizen of the United States, and residing at Detroit, in the county of Wayne and State of Michigan, have invented a new and Improved Vehicle-Shipping Apparatus, of which the following is a specification.

In the shipping of automobiles and trucks, it is common practice to stack them up or arrange them in two tiers, in order to more fully utilize the space and load capacity of the freight or flat cars on which they are carried. This practice has heretofore, so far as I am advised, proceeded along one of two lines, 1st, the supporting elements for the upper tier have been of an improvised nature, being used but once and thrown away when the car reached the dealer, or, 2nd, they have been made up of knock-down steel or wooden frames designed to be returned to the manufacturer. The first mode of procedure has been wasteful of material to such an extent as to constitute a large element in the selling cost; and such constructions of the second type as have been available heretofore have been of a bulky and expensive nature.

The primary object of the present invention is to provide a construction for supporting the upper cars of such nature that the essential parts may, for the most part, be easily coiled up or packed in small boxes and returned to the factory for re-use. Again, the invention permits the use of a minimum length of wooden struts or compression members, thereby reducing the bulk, weight and cost.

Another object is to provide a large measure of interchangeability between the various securing parts, both in the case of those which serve to secure the upper and those utilized for the same purpose in respect to the lower car.

Other objects will appear and be understood later.

In the drawings, Figure 1 is an end elevation showing one embodiment of the invention. Fig. 2 is a fragmentary longitudinal section showing one form of the details at the top of the posts. Fig. 3 is a side elevation corresponding to Fig. 1. Fig. 4 is a section on the line 4—4 of Fig. 1. Fig. 5 is a perspective view showing (in open position) the shackle which appears in Fig. 4, slightly modified to fit a round axle. Fig. 6 is a perspective view from which the construction of the holding devices for the axles of the lower car will be better understood. Fig. 7 is a part-side-elevation part-section showing a modification of the holding devices for the lower car. Fig. 8 is a fragmentary side elevation showing a different construction of the stays and associated members for holding the upper car. Fig. 9 is a longitudinal section through the upper end of the post shown in Fig. 8. Figs. 10 and 11 are end views showing other modifications of the supporting means for the upper car. Fig. 12 is a side view showing the application of the invention for stacking the cars in inclined position.

An ordinary freight car having the bottom 1, sides 2, end 3 and roof 4 appears in the drawings, but it will be understood that the subject matter of the invention is also applicable to flat cars and ships.

The automobile 10 of the lower tier may be held in place in various ways: in the embodiment shown in Figs. 1 to 6, the holding devices for the front axle 11 include a shackle having two duplicate elements 12—13 joined by a pivot 14 and adapted to be secured upon the axle by the bolt 15. These elements also include perforated ears 16. 17 indicates anchor blocks nailed to the floor and having perforated ears 18. As one convenient means for joining the ears 16 and 18, duplicate clevises 19—19' and associated pins 20 and turn buckles made up of the eye-bolts 21—22 and connecting member 23 may be employed. These devices afford a wide field of adjustment, and are preferably inclined either toward or from the central longitudinal vertical plane of the vehicle, thereby affording both transverse and longitudinal bracing, one such arrangement being shown in Fig. 1.

The same general construction serves for retaining the rear axle, it being desirable in this instance to provide the elements 12'—13', which correspond to the parts 12—13, with curved axle engaging surfaces 24, Fig. 5. In both cases, it is desirable that the axles themselves rest on short notched pedestals 25, Fig. 1, to prevent loosening of parts in the event of leakage of air.

A modified and somewhat cheaper construction appears in Fig. 7, wherein the members 12—13 are replaced by duplicate elements 12″—13″ joined by two bolts 15″ and having spaced ears 16″, and wherein the anchor blocks 17″ are also provided with spaced ears 18″. The turn buckle 21″—22″—23″ in this case has its eyes loosely received on the pins 20″ so as to permit the requisite angular adjustment for insuring both transverse and longitudinal bracing.

The supporting means for the upper car includes four struts or posts inclined transversely of the vehicle and suitably braced as hereinafter described. In Figs. 1 to 3, these posts are indicated at 30 and have their lower ends nailed to the floor, their upper ends being pierced to receive the front and rear spindles 31 and 32 of the car 33, said spindles being clamped firmly to the posts by the usual wheel retaining nuts 34. In order to provide for properly bracing the upper ends, said posts are drilled, preferably just below the spindles, to permit the passage of the eye-bolts 35 which are threaded at one end to receive the eye-nuts 36, and these bolts and nuts together serve for the attachment of suitable adjustable tension means such as the wire cables 40, anchoring devices 41, clevises 42 and turn-buckles 43, said parts 41, 42 and 43 being duplicates of the elements 17, 19′ and 21—22—23 heretofore described.

In a similar manner, a construction embodying a considerable measure of duplication of the parts appearing in Fig. 7 may be used for bracing the posts 30′, Figs. 8 and 9, said construction including the fittings 45 which are passed through the eye-nuts 46 and clamped to the posts by bolts 47 above and below the spindles, together with anchor and turn buckle devices 48—49 including the rods 50 which may be integral with the parts 46 or separate therefrom as shown, said parts, with the exception of the rods 50, being duplicates of the parts 17″—22″—23″, respectively. In either case, the upper end portions of the posts may be reinforced against splitting by U-shaped metal clips 51. Another manner of attaching the posts to the floor also appears in Fig. 8, this being accomplished by the angle clips 53 bolted at 54 through the posts and perforated for nailing to the floor.

As best indicated in Fig. 1, the bracing members for the posts are preferably arranged on each side in planes inclined downwardly and inwardly from the upper ends thereof toward the longitudinal center of the car, and in the construction shown these planes substantially bisect the angle between the plane determined by the corresponding posts and a vertical plane through the upper ends of said posts. Therefore, it will be understood that proper clearance for the fenders of the lower car together with a very stiff bracing against lateral as well as longitudinal movement of the car is insured, for any angular movement of the posts in either direction tends to lengthen the tension connections on the side toward which such movement is directed.

If desired, the posts may be additionally braced by struts 55 toe-nailed or otherwise secured between their upper ends and the studding or side stakes 56 or other stiff element of the carrying vehicle, or by a tension cross-rod 57 having a turn-buckle or other take-up device 58, Fig. 1, or both. In case the vehicles are positioned close to the end of the car, it is also advisable in some cases to brace the upper ends of the struts 30 by the longitudinally extending turn-buckles 59 which are anchored to the studding or other stiff end portion of the car, Fig. 3.

It will be noted that the various parts are of relatively inexpensive construction and that all elements of the supports for both cars, with the possible exception of the posts, may be readily packed in a small box and returned to the manufacturer when the vehicles have been delivered. The shape of the posts 30—30′ renders it, moreover, quite feasible for the larger dealers to ship them back to the factory, inasmuch as they occupy but little space and are susceptible of being used repeatedly.

Both the upper and the lower cars are securely braced, and in the case of the upper car its body unites with the supporting members to form a truss whose longitudinally inclined, and therefore longer, members are always in tension, and whose relatively short posts are in compression. The ease of adjustment of these tension members also gives considerable latitude in the selection of good anchorage for the elements 41—47—17—17″.

In some instances, as shown in Fig. 10, the tension elements or braces for the upper car (or for the upper end of a car inclined as shown in Fig. 12) may be made fast to the corresponding axle at a point 60, well inside of the spindle, whereby the stresses in the axle, incidental to the bumping of one freight car into another, are reduced. Somewhat the same result may be accomplished, see Fig. 11, by detachably connecting the wooden or metal posts 61, which correspond in location to the posts 30—30′, by a beam 62 having pedestals 63 upon which the axle 64 of the vehicle is clamped, as by means of the post clamps 65. The tension elements 66 correspond to the parts 40—42—43 or 49—50, as the case may be.

Another manner of utilizing the invention is indicated in Fig. 12, wherein the vehicle is inclined, the front axle being held in place by devices 68 corresponding to the parts shown in Figs. 6 and 7, and the rear axle being supported on devices 30′ which may be identical with any of the several devices shown in Figs. 1, 3, 8, 9 and 10 for supporting an elevated axle.

Various other changes may be made in the details of construction without departing from the spirit of the invention, and I do not, therefore, wish to be limited except as set forth in the claims.

I claim:—

1. Means for supporting a vehicle axle construction having wheel spindles, said means comprising a pair of struts whereon the weight from a pair of said spindles is carried, and tension elements attached to the upper portions of said struts and diverging downwardly and inwardly therefrom both forwardly and rearwardly in respect to the corresponding strut.

2. Means for supporting a vehicle axle having wheel spindles, said means comprising a pair of struts whereon the weight from a pair of said spindles is carried, and tension elements attached to the upper portions of said struts and diverging downwardly and inwardly therefrom both forwardly and rearwardly in respect to the corresponding strut, one of said tension elements for each strut including a turn-buckle device.

3. The combination with a carrier, of means for supporting a motor vehicle axle construction therein, said means including a single inwardly inclined strut on each side of the vehicle and receiving the weight from the corresponding end portion of the axle construction, and tension members secured to the upper ends of the struts and inclined downwardly and both forwardly and rearwardly therefrom on the inner sides of the planes which pass lengthwise through the struts and longitudinally of the vehicle.

4. Means for supporting a vehicle having a pair of wheel spindles, said means co-acting with the vehicle itself to form a truss transversely of the latter and including struts on each side of said vehicle receiving the weight from said spindles, said struts being arranged substantially in the vertical plane which passes through both spindles, and tension means fastened to the upper end portions of the corresponding strut and having anchorages both forwardly and rearwardly of said strut, one of said anchorages of the tension means corresponding to each strut being disposed inwardly from the lower end of the corresponding strut.

5. Means for supporting a vehicle having two pairs of wheel spindles, said means co-acting with the vehicle to form trusses longitudinally of the latter and including struts on each side of the vehicle receiving the weight from said spindles and arranged substantially in the transverse vertical planes which pass through the corresponding pair of wheel spindles, and tension elements fastened to the upper end portions of the struts and diverging inwardly, downwardly, forwardly and rearwardly from the corresponding strut.

6. Means for supporting a vehicle having two pairs of wheel spindles, said means co-acting with the vehicle to form trusses longitudinally of the latter and including struts on each side of the vehicle receiving the weight from said spindles and arranged substantially in the transverse vertical planes which pass through the corresponding pair of wheel spindles, and tension elements fastened to the upper end portions of the struts and diverging inwardly, downwardly, forwardly and rearwardly from the corresponding strut, each of said tension elements including a turn-buckle device.

7. Means for supporting a vehicle having wheel spindles, said means comprising a wooden post through the upper end of which a wheel spindle passes, tension elements diverging downwardly from the upper end of the post, means connecting the upper end portions of said tension elements, and means, held in place by said connecting means, for preventing the post from splitting.

8. Means for supporting one end of a vehicle from the corresponding axle, said means including a pair of upwardly and inwardly inclined struts, one for each end of said axle, positioned substantially in a vertical transverse plane of the vehicle which includes said axle, and anchored pairs of angularly adjustable tension members attached to the upper ends of said struts and diverging downwardly and inwardly from the upper ends of the corresponding struts.

9. Vehicle holding means including clamps for an axle of said vehicle, and pairs of anchored tension members attached to said clamps and diverging from each other longitudinally of the vehicle, the tension members for the opposite ends of said axle being inclined oppositely in respect to the central vertical longitudinal plane of the vehicle.

10. Vehicle holding means including clamps for an axle of said vehicle, and pairs of anchored tension members attached to said clamps and diverging from each other longitudinally of the vehicle, the tension members for the opposite ends of said axle being inclined oppositely in respect to the central vertical longitudinal plane of the vehicle, one of said tension members of each pair including a turn-buckle device.

11. Vehicle holding means including clamps for an axle of said vehicle, and a pair of anchored tension members attached to said clamps and diverging from each other longitudinally of the vehicle.

12. Vehicle holding means including clamps for the axle of said vehicle, said clamps having oppositely disposed ears, anchored tension elements attached to said ears, one of said elements being inclined downwardly and forwardly from the clamp and the other being inclined downwardly and rearwardly therefrom.

13. Vehicle holding means including a split clamp embracing an axle of said vehicle, and anchored tension elements inclined both forwardly and rearwardly from said clamp.

14. Means for supporting a vehicle axle construction having wheel spindles, said means comprising a pair of struts whereon the weight from a pair of said spindles is carried, and tension elements attached to the upper portions of said struts and diverging downwardly therefrom both forwardly and rearwardly in respect to the corresponding strut.

15. Means for supporting a vehicle axle construction having wheel spindles, said means comprising a pair of struts whereon the weight from a pair of said spindles is carried, tension elements attached to the upper portions of said struts and diverging downwardly therefrom both forwardly and rearwardly in respect to the corresponding strut, and additional bracing means coöperating with the upper portions of said struts to prevent lateral swaying.

16. Means for supporting a vehicle axle construction having wheel spindles, said means comprising a pair of struts whereon the weight from a pair of said spindles is carried, tension elements attached to the upper portions of said struts and diverging downwardly therefrom both forwardly and rearwardly in respect to the corresponding strut, and an adjustable tension member extending across between the upper portions of said struts to prevent lateral swaying.

17. Means for supporting a vehicle axle construction having wheel spindles, said means comprising a pair of struts whereon the weight from a pair of said spindles is carried, tension elements attached to the upper portions of said struts and diverging downwardly therefrom both forwardly and rearwardly in respect to the corresponding strut, and a pair of outwardly extending struts coöperating with the upper end portions of said first named struts to prevent swaying.

18. Means for supporting a vehicle axle construction comprising a pair of posts whereby the weight of the axle construction is carried, and a tension element including a turn buckle connected directly to the upper end of each post to brace the same.

RALPH Z. HOPKINS.